(12) United States Patent
Guo et al.

(10) Patent No.: US 12,738,294 B2
(45) Date of Patent: Sep. 15, 2026

(54) DATA STORAGE DEVICE WITH ASSISTIVE BURSTS IN SERVO SECTORS

(71) Applicant: WESTERN DIGITAL TECHNOLOGIES, INC., San Jose, CA (US)

(72) Inventors: Guoxiao Guo, Irvine, CA (US); Charles A. Park, Aromas, CA (US); Yun Hong, San Jose, CA (US); Scott A. Ottele, Longmont, CO (US); Gary Herbst, San Jose, CA (US); Satoshi Yamamoto, Hollister, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/937,617

(22) Filed: Nov. 5, 2024

(65) Prior Publication Data

US 2026/0128060 A1 May 7, 2026

(51) Int. Cl.

| | |
|---|---|
| ***G11B 20/12*** | (2006.01) |
| ***G11B 5/02*** | (2006.01) |
| ***G11B 5/55*** | (2006.01) |
| ***G11B 5/596*** | (2006.01) |
| ***G11B 27/36*** | (2006.01) |

(52) U.S. Cl.

CPC .............. *G11B 5/5526* (2013.01); *G11B 5/02* (2013.01); *G11B 5/59627* (2013.01)

(58) Field of Classification Search

CPC .......... G11B 20/10222; G11B 5/59666; G11B 5/59661; G11B 20/10009; G11B 27/36; G11B 5/012; G11B 5/00; G11B 5/09; G11B 2220/90; G11B 2020/10916; G11B 2020/1267; G11B 5/6005; G11B 5/024; G11B 5/0086; G11B 5/02; G11B 20/20; G11B 20/12; G11B 5/5539; G11B 5/59627

USPC ............................... 360/48, 77.04, 78.09, 76

See application file for complete search history.

(56) References Cited

U.S. PATENT DOCUMENTS

| | | | |
|---|---|---|---|
| 5,796,543 A | 8/1998 | Ton-That | |
| 6,937,424 B2 | 8/2005 | Chang et al. | |
| 6,995,937 B2 | 2/2006 | Ehrlich | |
| 7,046,465 B1 * | 5/2006 | Kupferman ........ | G11B 5/59688 360/48 |

(Continued)

OTHER PUBLICATIONS

Mamun et al., “Efficient position encoding in hard disk drive using dual frequency servo bursts”, https://www.researchgate.net/publication/3931767_Efficient_position_encoding_in_hard_disk_drive_using_dual_frequency_servo_bursts, IECON’01: The 27th Annual Conference of the IEEE Industrial Electronics Society, Year 2001, 6 pages.

(Continued)

*Primary Examiner* — Nabil Z Hindi

(74) *Attorney, Agent, or Firm* — Calderon Safran & Wright P.C.

(57) ABSTRACT

Various illustrative aspects are directed to a data storage device, method, and one or more processing devices that are configured to: during a read operation, open a servo gate in the selected head in order to read the first servo bursts, the sync mark, and the second servo bursts in one of the servo sectors; and determine a position error signal for the selected head based on reading the first servo bursts and the second servo bursts.

20 Claims, 6 Drawing Sheets

(56) References Cited

U.S. PATENT DOCUMENTS

| | | | |
|---|---|---|---|
| 7,110,208 | B1 | 9/2006 | Miyamura et al. |
| 7,787,208 | B2 | 8/2010 | Min et al. |
| 8,213,106 | B1 | 7/2012 | Guo et al. |
| 8,531,798 | B1 | 9/2013 | Xi et al. |
| 8,711,504 | B1 | 4/2014 | Everett et al. |
| 8,760,794 | B1 | 6/2014 | Coker et al. |
| 8,861,118 | B1 | 10/2014 | Creech et al. |
| 9,013,824 | B1 | 4/2015 | Guo et al. |
| 9,047,919 | B1 | 6/2015 | Guo et al. |
| 11,417,362 | B2 | 8/2022 | French, Jr. et al. |
| 11,830,524 | B1 | 11/2023 | Yasuna et al. |
| 12,046,256 | B2 | 7/2024 | Yamamoto |
| 12,094,503 | B1 | 9/2024 | Guo et al. |
| 12,100,431 | B1 | 9/2024 | Guo et al. |
| 2015/0243311 | A1 | 8/2015 | Grundvig et al. |
| 2021/0327469 | A1 | 10/2021 | Tagami |

OTHER PUBLICATIONS

Guo et al., "Achieving Minimal Repeatable Runout", https://www.researchgate.net/publication/330596291, Asia-Pacific Magnetic Recording Conference 2018, Nov. 2018, 2 Pages.

* cited by examiner

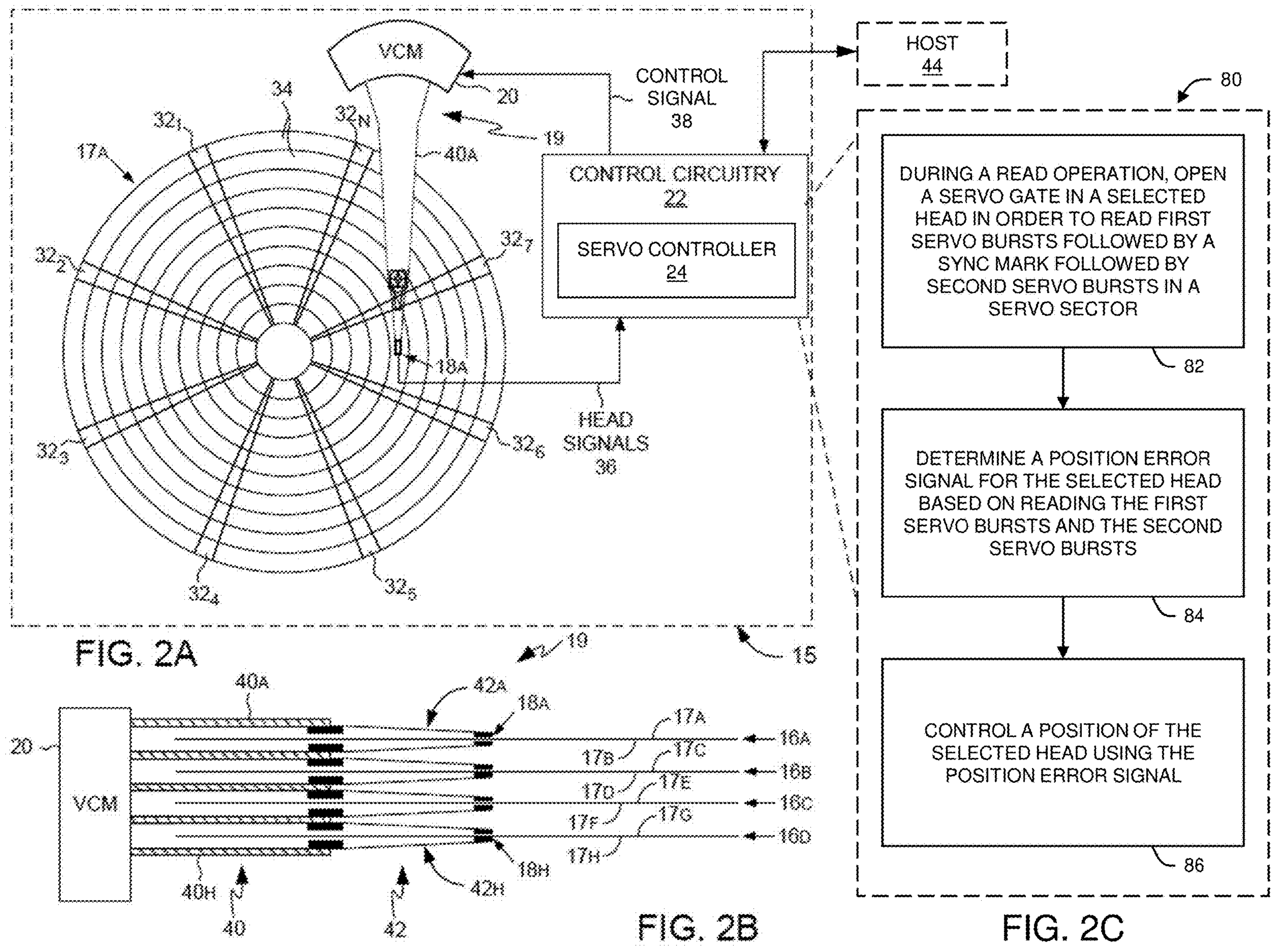
VCM
20
34
$32_1$
$32_N$
19
40A
17A
CONTROL SIGNAL
38
HOST
44
CONTROL CIRCUITRY
22
SERVO CONTROLLER
24
$32_2$
$32_7$
18A
$32_3$
$32_6$
HEAD SIGNALS
36
$32_4$
$32_5$
FIG. 2A
19
15
40A
42A
18A
17A
20
VCM
17B
17C
16A
16B
17D
17E
16C
17F
17G
16D
17H
18H
40H
42H
40
42
FIG. 2B
80
DURING A READ OPERATION, OPEN A SERVO GATE IN A SELECTED HEAD IN ORDER TO READ FIRST SERVO BURSTS FOLLOWED BY A SYNC MARK FOLLOWED BY SECOND SERVO BURSTS IN A SERVO SECTOR
82
DETERMINE A POSITION ERROR SIGNAL FOR THE SELECTED HEAD BASED ON READING THE FIRST SERVO BURSTS AND THE SECOND SERVO BURSTS
84
CONTROL A POSITION OF THE SELECTED HEAD USING THE POSITION ERROR SIGNAL
86
FIG. 2C First Servo Bursts 305
Gray Code 310
Sync Mark 315
Second Servo Bursts 320
300

RRO Data 325
First Servo Bursts 305
Preamble 330
Sync Mark 315
Gray Code 310
Second Servo Bursts 320
300'

First Servo Bursts 305
Second Servo Bursts 320

RRO Data 325
First Servo Bursts 305
Sync Mark 315
Second Servo Bursts 320
300'''

RRO Data 325
Preamble 330
Sync Mark 315
Gray Code 310
Second Servo Bursts 320

DATA STORAGE DEVICE WITH ASSISTIVE BURSTS IN SERVO SECTORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $\mathbf{6}_0$-$\mathbf{6}_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $\mathbf{6}_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $\mathbf{6}_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive position error signal determination using values obtained by reading respective first servo bursts and second servo bursts in a servo sector that is devoid of a preamble. In various examples, the servo sector includes the first servo bursts followed by a sync mark followed by the second servo bursts in a longitudinal direction of a track containing the servo sector. In some embodiments, since the servo sector does not include a preamble, the first servo bursts may be written at the beginning region of the servo sector where the preamble normally would be written. In embodiments, the first servo bursts written in this region of the servo sector provide the servo sector with additional servo bursts compared to servo sectors that include a preamble at this region. In embodiments, the additional servo bursts increase the amount of servo burst information that is usable in determining the PES, which advantageously reduces the repeatable runout (RRO) component of the PES associated with read operations.

Various illustrative aspects are directed to a data storage device comprising: one or more disks each comprising a plurality of servo sectors defining a plurality of data tracks, wherein each of the servo sectors comprises first servo bursts followed by a sync mark followed by second servo bursts; an actuator mechanism configured to position a selected head among one or more heads proximate to a corresponding disk surface of a corresponding disk among the one or more disks; and one or more processing devices. The one or more processing devices, individually or in combination, are configured to: during a read operation, open a servo gate in the selected head in order to read the first servo bursts, the sync mark, and the second servo bursts in one of the servo sectors; and determine a position error signal for the selected head based on reading the first servo bursts and the second servo bursts.

Various illustrative aspects are directed to a method comprising: during a read operation, open a servo gate in a selected head in order to read first servo bursts followed by second servo bursts in a servo sector that is devoid of a preamble; determine a position error signal for the selected head based on reading the first servo bursts and the second servo bursts; and control a position of the selected head using the position error signal, wherein the opening the servo gate, the determining the position error signal, and the controlling the position of the selected head are performed by one or more processing devices individually or in combination.

Various illustrative aspects are directed to one or more processing devices comprising: means for opening a servo gate in a selected head, during a read operation, in order to read repeatable runout (RRO) correction data followed by a sync mark followed by servo bursts in a servo sector; means for generating a control signal for the selected head based on reading the RRO correction data and the servo bursts; and means for controlling a position of the selected head using the control signal.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that control circuitry of a disk drive may perform or execute in controlling the operations of the disk drive, in accordance with aspects of the present disclosure.

DETAILED DESCRIPTION

Figure 1:
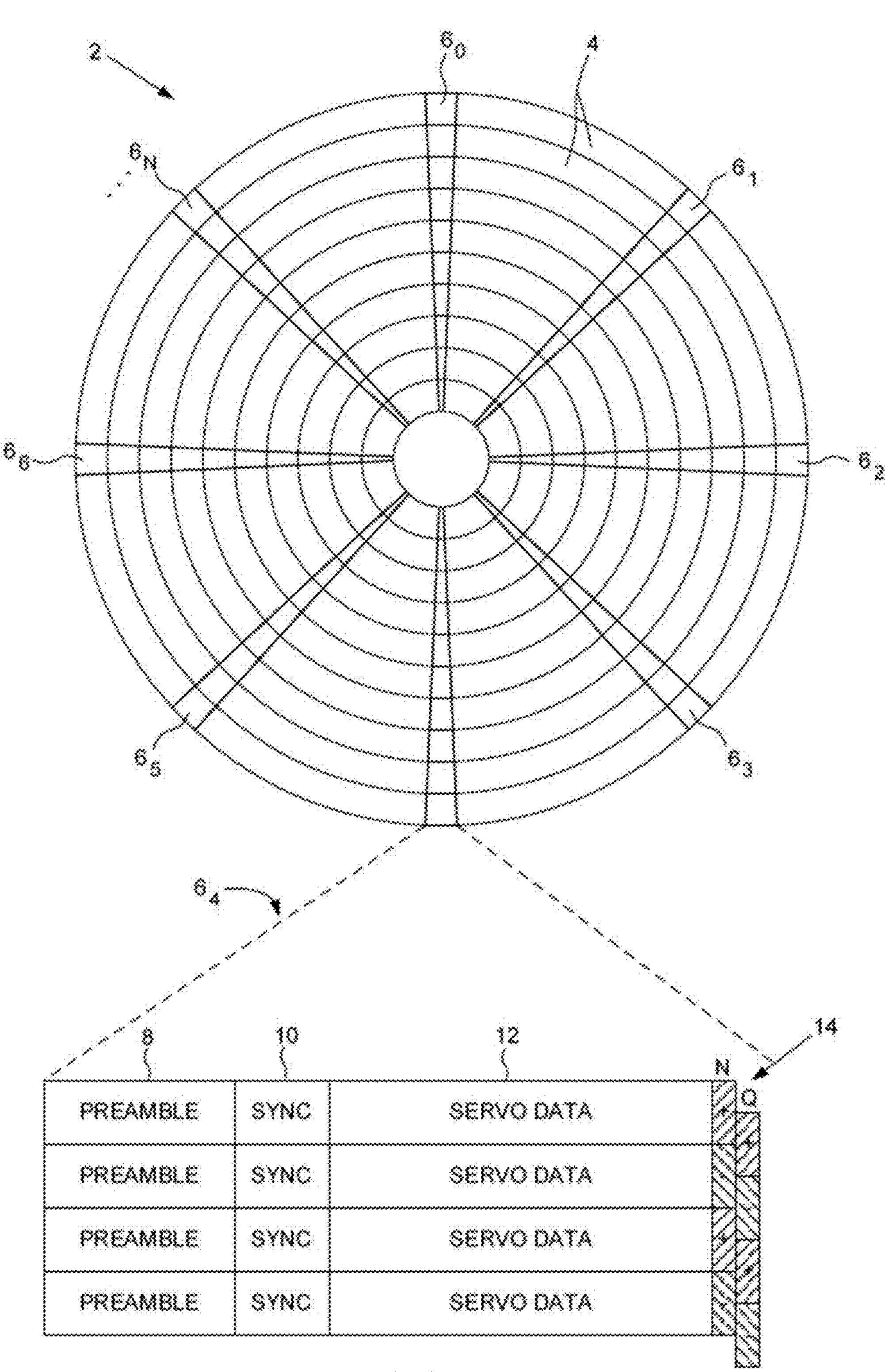
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that servo controller 24 of control circuitry 22 may perform or execute in controlling the operations of disk drive 15, in accordance with aspects of the present disclosure, including determining a position error signal for a head in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $\mathbf{32}_1$-$\mathbf{32}_N$, which define a plurality of servo tracks 34, wherein data tracks are defined relative to the servo tracks 34, and which may be at the same or different radial density. Control circuitry 22 including servo controller 24 processes head signals 36 (e.g., one or more read signals) emanating from the respective head, e.g., head 18A, to read from disk surface 17A, to demodulate the servo wedges $\mathbf{32}_1$-$\mathbf{32}_N$ and generate a position error signal (PES) representing an error between the actual position of the head and a target position relative to a target track. Servo controller 24 in control circuitry 22 filters the PES from the servo wedges using a suitable compensation filter to generate a control signal 38 applied to actuator arm assembly 19, including to primary actuator 20, which functions as a control actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, servo controller 24 of control circuitry 22 may, during a read operation, open a servo gate in a selected head in order to read first servo bursts followed by a sync mark followed by second servo bursts in a servo sector (82). Servo controller 24 may further determine a position error signal for the selected head based on reading the first servo bursts and the second servo bursts (84). Servo controller 24 may further control a position of the selected head using the position error signal (86). Control circuitry 22, including servo controller 24, may further perform additional actions, methods, and techniques, in accordance with various aspects as further described herein.

The term "servo controller 24" as used herein may refer to any hardware, firmware, software, and/or combination thereof, comprised in control circuitry 22 of disk drive 15, which implements, embodies, or engages in any of the structures or functions ascribed herein to servo controller 24 or to any other of the novel and inventive aspects of the present disclosure. Servo controller 24 may constitute any hardware, firmware, software, and/or any other elements of control circuitry 22 for determining a position error signal for a selected head based on reading first servo bursts and the second servo bursts, and performing other techniques and methods as described herein.

Figures 3A, 3B, 3C, 3D, 3E:
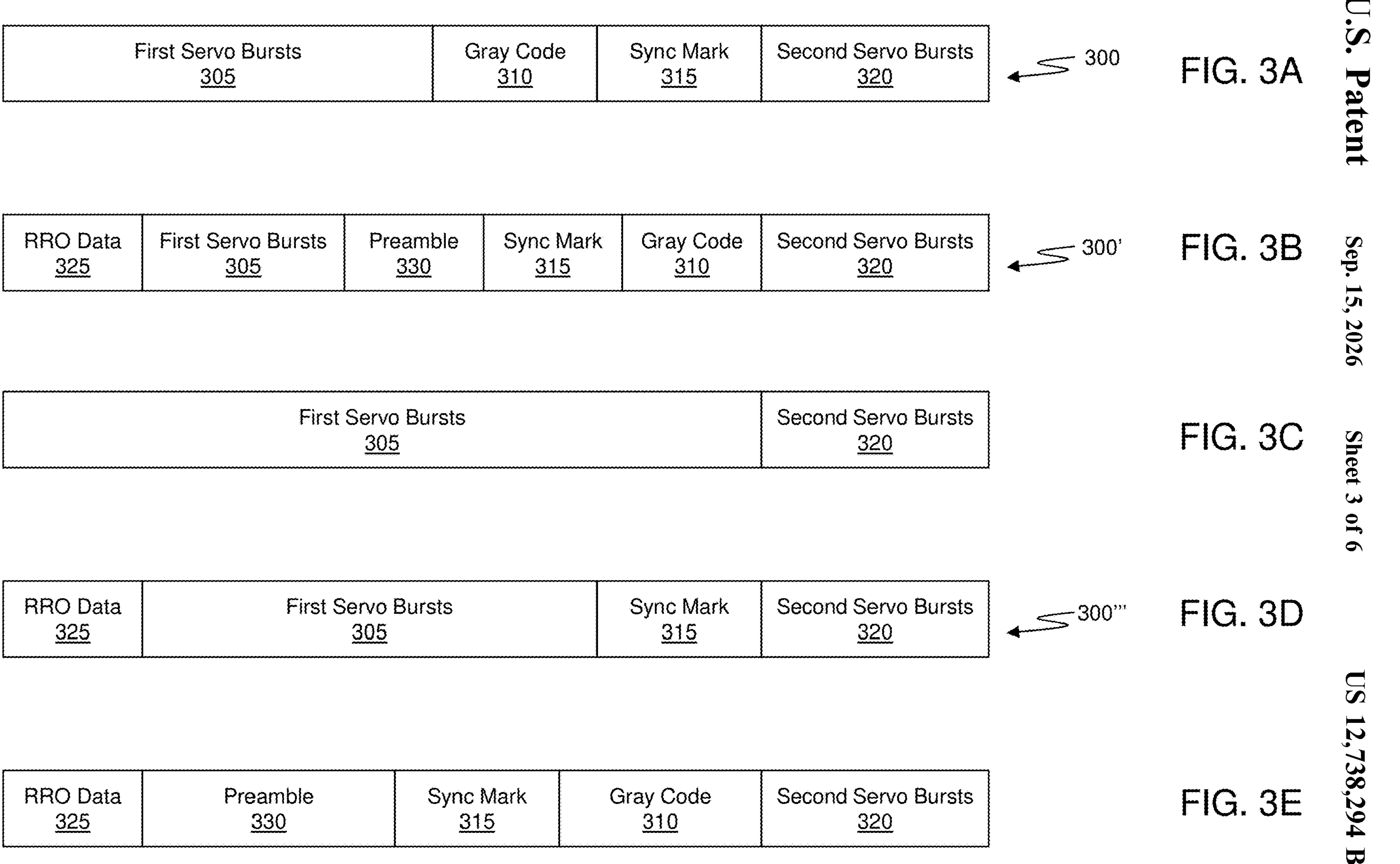
FIG. 3A-3E depict exemplary servo sectors in accordance with aspects of the present disclosure.

FIG. 3A depicts an exemplary servo sector 300 in accordance with various aspects of this disclosure. Servo sector 300 may represent one of many respective servo sectors included in respective tracks on respective disks 16 in disk drive 15 of FIG. 2A. In embodiments, servo sector 300 includes first servo bursts 305, gray code 310, sync mark 315, and second servo bursts 320 arranged sequentially (i.e., one following another) in a longitudinal direction of a track containing servo sector 300. Gray code 310 may include an address of the track (also called a track identifier (ID) or TID) and an address of servo sector 300 in the track. Sync mark 315 may comprise a pattern such as a servo address mark (SAM) or servo index mark (SIM) used to symbol synchronize to a servo data field, e.g., as described with respect to FIG. 1. In embodiments, first servo bursts 305 and second servo bursts 320 each comprise a respective group of phase-based servo bursts (e.g., a periodic sequence of magnetic transitions) that are recorded with a predetermined phase relative to one another and relative to a centerline of the track containing servo sector 300.

With continued reference to FIG. 3A, in accordance with aspects of the present disclosure, servo sector 300 is written to the disk without a preamble as compared to the servo sector format shown in FIG. 1. In this manner, servo sector 300 is devoid of (i.e., does not include) a preamble. In embodiments, writing servo sectors without preambles improves the format efficiency of the disk by reserving more area for user data. In one embodiment, writing servo sectors without preambles means the gain control and timing synchronization may be implemented without the benefit of reading a preamble at the beginning of each servo sector. Since servo sector 300 does not include a preamble, first servo bursts 305 may be written at the beginning region of the servo sector where the preamble normally would be written.

According to aspects of the present disclosure, during a read operation, servo controller 24 determines the PES for the head based on respective readings from each of first servo bursts 305 and second servo bursts 320. In embodiments, first servo bursts 305 provide servo sector 300 with additional servo bursts as compared to the servo sector format shown in FIG. 1. In embodiments, these additional servo bursts increase the amount of servo burst information that is usable in determining the PES as compared to the servo sector format shown in FIG. 1. In embodiments, this increased amount of servo burst information reduces the repeatable runout (RRO) component of the PES associated with read operations as compared to when a PES is determined using the servo sector format shown in FIG. 1. Reducing the RRO component of the PES in this manner advantageously reduces an amount of RRO correction data used with the disk, which advantageously reduces an amount of time spent determining the RRO correction data and an amount of memory used to store the RRO correction data.

FIG. 3B shows an embodiment of servo sector 300' that includes RRO data 325 and a preamble 330. In various embodiments, RRO data 325 includes RRO correction data used to correct the RRO component of the PES associated with read operations. Such data may be determined during manufacture and testing of the disk drive and servo written on the disk in servo sector 300'. In embodiments, due to the reduction of the amount of RRO correction data that results from using the additional servo bursts, the RRO correction data may be advantageously stored in the servo sector 300' instead of being stored in a separate memory such as NAND flash memory or dynamic random-access memory (DRAM). In accordance with aspects of the present disclosure, RRO data 325 in servo sector 300' precedes gray code 310 and sync mark 315. In one example, RRO data 325 precedes the first servo bursts 305 to accommodate writing transients associated with RRO data 325. In one example, RRO data 325, first servo bursts 305, preamble 310, sync mark 315, gray code 310, and second servo bursts 320 are arranged sequentially (i.e., one following another) in a longitudinal direction of a track containing servo sector 300'.

Given that the write head is behind the read head by a few micrometers in the down-track direction and that the read head is configured to see at least second servo bursts 320 before stopping writing the user data in the write mode, keeping the gray code 310 and sync mark 315 as short as possible, such as described in U.S. Pat. No. 11,417,362 entitled "DATA STORAGE DEVICE ELIMINATING PREAMBLE FROM SERVO SECTORS", leaves more room in the servo sector for fields such as first servo bursts 305 and RRO data 325 between the user data and the other parts of the servo pattern. As such, while being devoid of preamble is not a prerequisite for some embodiments (e.g., FIGS. 3B and 3E), some other embodiments (e.g., FIGS. 3A and 3D) do eliminate the preamble to free up more room in the servo sector for fields such as first servo bursts 305 and/or RRO data 325, thereby making these embodiments more effective in reducing the RRO in the read user data mode servo operations. Some embodiments may utilize a zoned servo pattern layout in which the outer diameter side of each zone has a shorter room for the first servo bursts 305 and/or RRO data 325. Consequently, some embodiments utilize more servo zones and continuous zone servo to leave more room for the first servo burst 305 and/or RRO data 325.

FIG. 3C shows an embodiment of servo sector 300" that includes first servo bursts 305 followed by second servo bursts 320 arranged sequentially (i.e., one following another) in a longitudinal direction of a track containing servo sector 300". In this embodiment, servo sector 300" does not include gray code, a preamble, RRO data, or a sync mark. In various examples, in servo wedges of the disk, control circuitry 22 uses only the second servo bursts 320 for all write operations, such that there is a longer space in these servo wedges for the first servo bursts 305. Consequently, in these servo wedges, the read mode PES determined using the relatively longer first servo bursts 305 is more effective in reducing the RRO during a read operation, thereby eliminating the need to perform a RRO calibration for read mode in the manufacturing process, and the need for storing the corresponding RRO data that is either written in the servo sector on the disk itself or stored in memory, and the subsequent operations of reading and using such data during the servo operation.

FIG. 3D shows an embodiment of servo sector 300" that includes the RRO data 325 preceding the first servo bursts 305 followed by sync mark 315 followed by second servo bursts 320 in a longitudinal direction of a track containing servo sector 300". In this embodiment, servo sector 300" does not include gray code or a preamble.

FIG. 3E shows an embodiment of servo sector 300"" that includes RRO data 325 preamble 330, sync mark 315, Gray code 310, and second servo bursts 320 arranged sequentially (i.e., one following another) in a longitudinal direction of a track containing servo sector 300"". In this embodiment, the space in the servo sector 300"" preceding the preamble is allocated to write the RRO data 325, for example when the length is not sufficient for an effective, i.e., long enough, set of first servo bursts 305.

Figures 4A, 4B, 4C, 4D, 4E:
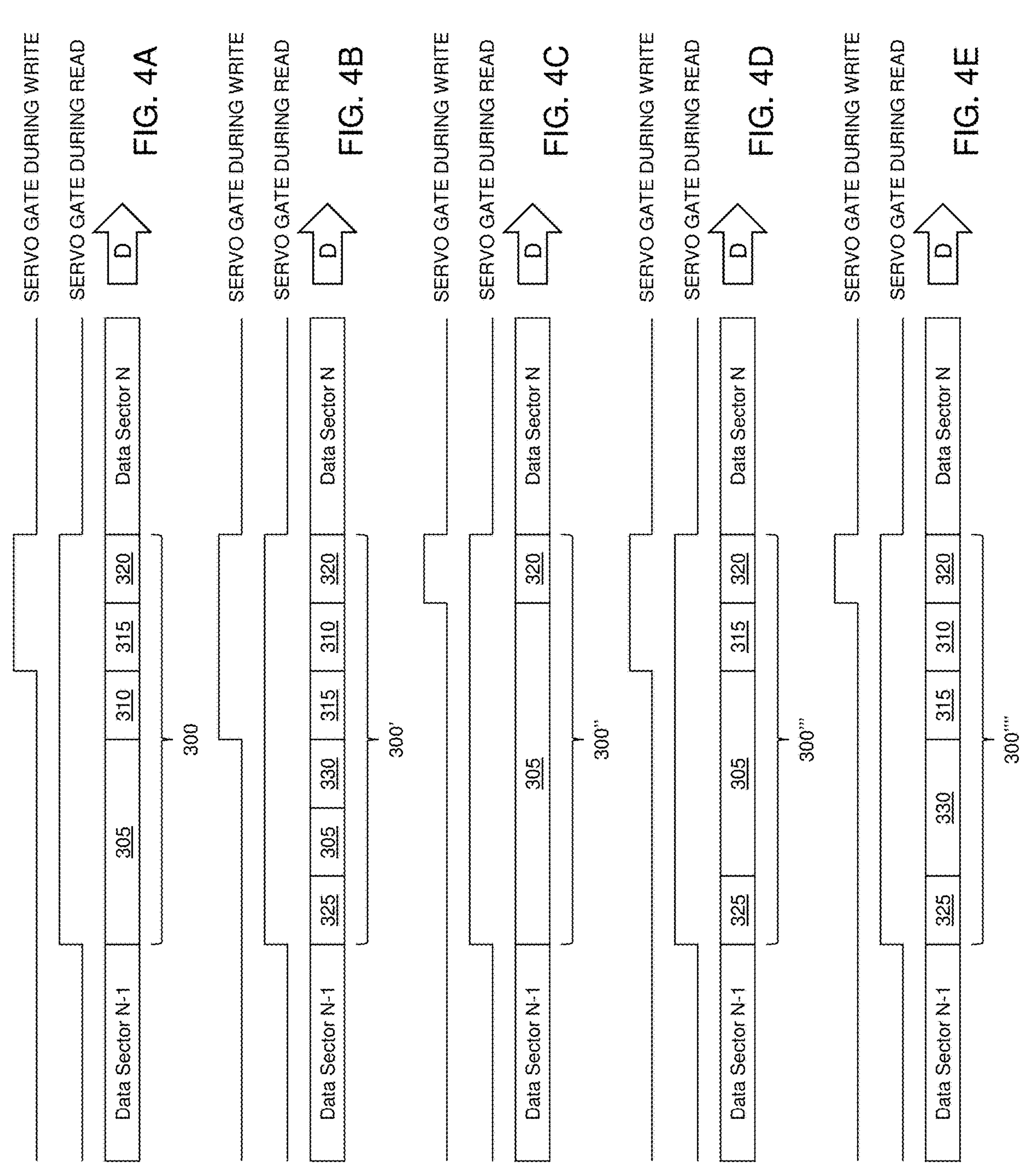
FIG. 4A-4E depict controlling a servo gate relative to servo sectors in accordance with aspects of the present disclosure.

FIG. 4A shows exemplary states of a servo gate relative to servo sector 300 in accordance with aspects of the present disclosure. In various embodiments, servo controller 24 of FIG. 2A generates a servo timing window that includes a servo gate window, which enables reading servo information in servo sector 300 using a read element in a head (e.g., head 18A of FIG. 2A) passing over servo sector 300. In embodiments, servo controller 24 demodulates the servo information that is read using the read element, processes the demodulated servo information in order to determine the PES, and generates a control signal based on the PES. In embodiments, the control signal is configured to be applied to the VCM (e.g., VCM of FIG. 2A) for controlling a position of the head, e.g., relative to a target position such as a centerline of a track over which the head is travelling. As shown in FIG. 4A, arrow "D" represents the direction of travel of the head over the surface of the disk containing servo sector 300 (i.e., in a longitudinal direction of a track containing servo sector 300), such that the head travels over data sector N−1, then travels over servo sector 300, and then travels over data sector N. In the example shown in FIG. 4A, data sector N follows servo sector 300 and is the data sector associated with servo sector 300.

In embodiments, when performing a read operation of the data sector associated with servo sector 300, servo controller 24 opens the servo gate to allow the read element to read first servo bursts 305, gray code 310, sync mark 315, and second servo bursts 320 of servo sector 300. However, during a write operation, the servo gate may be opened in a manner that reduces a write gap that would otherwise precede each servo sector. In one example, during a write operation the servo gate is opened to allow the read element to read sync mark 315 and second servo bursts 320, without reading first servo bursts 305 and gray code 310. In another example, during a write operation the servo gate is opened to allow the read element to read some of gray code 310 (e.g., such as the least significant bits of the track ID), sync mark 315, and second servo bursts 320, without reading first servo bursts 305.

FIGS. 4B, 4C, 4D, and 4E show exemplary states of a servo gate relative to servo sectors 300', 300", 300", and 300", respectively, in accordance with aspects of the present disclosure. FIGS. 4B, 4C, 4D, and 4E illustrate how servo controller 24 is configured in embodiments to control the servo gate relative to servo sectors 300', 300", 300", and 300" differently during read operations compared to during write operations, e.g., in a manner similar to that of FIG. 4A, or various write gate operation modes that are different from FIG. 4A. In all configurations, different wedges, such as the odd and even wedges, may have different write gate configurations.

Figures 5A, 5B:
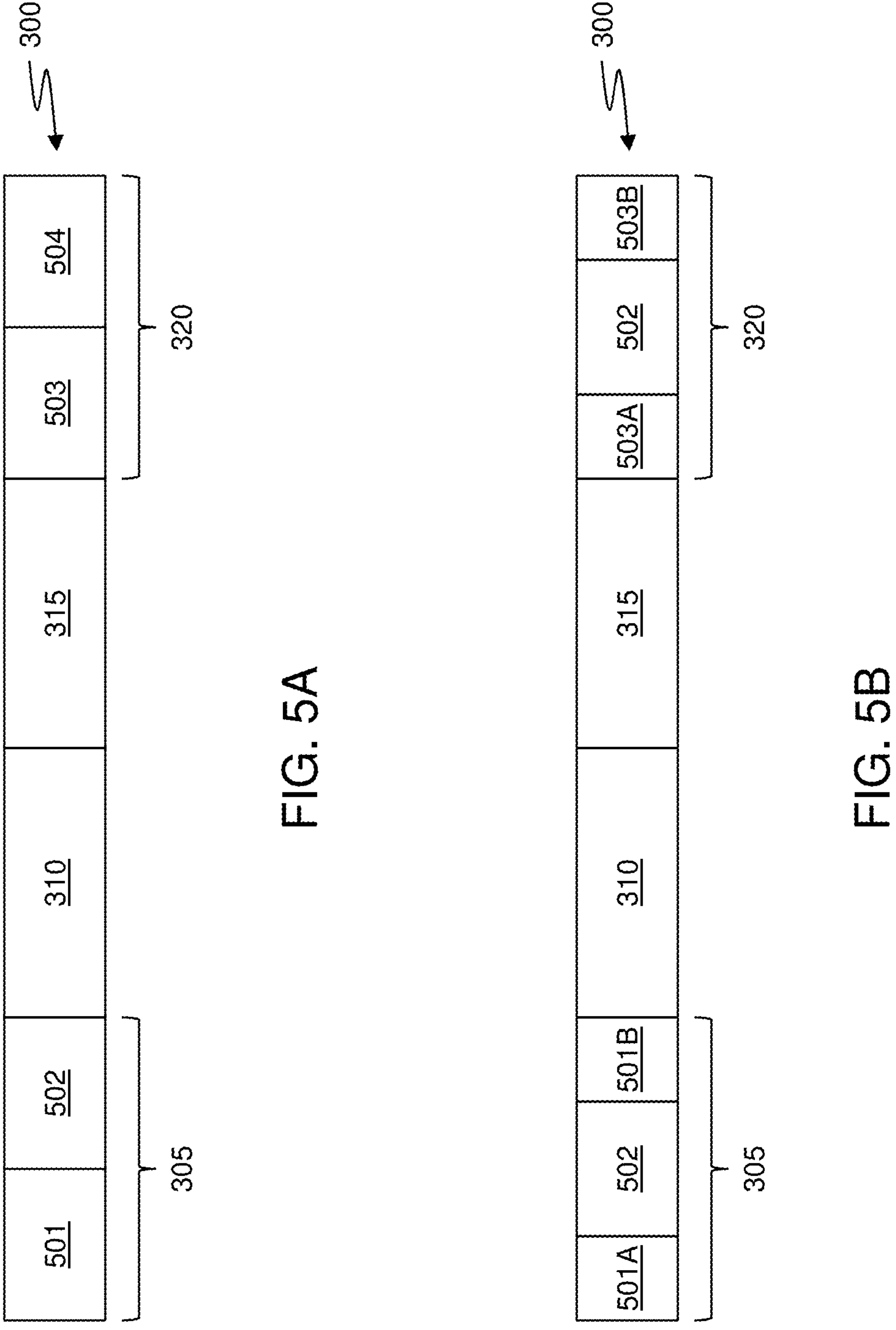
FIG. 5A-5B show exemplary implementations of first servo bursts and second servo bursts in a servo sector in accordance with aspects of the present disclosure.

FIG. 5A shows an exemplary implementation of first servo bursts 305 and second servo bursts 320 of servo sector 300 in accordance with aspects of the present disclosure. In various embodiments, first servo bursts 305 include first burst 501 and second burst 502, and second servo bursts 320 include third burst 503 and fourth burst 504. In embodiments, first burst 501 and third burst 503 are a first burst type, and second burst 502 and fourth burst 504 are a second burst type different than the first burst type. In one example, first burst 501 and second burst 502 correspond respectively to a first A burst and a first B burst of a first null burst servo pattern, and third burst 503 and fourth burst 504 correspond respectively to a second A burst and a second B burst of a second null burst servo pattern. In this example, the A bursts (which may also be referred to as N bursts) have a first pattern polarity, and the B bursts (which may also be referred to a Q bursts) have a second pattern polarity different than the first pattern polarity. In various embodiments, the first pattern polarity and the second pattern polarity are selected such that when reading back the first burst A and second burst B, their amplitude versus offtrack has a half of a track offset.

FIG. 5B shows another exemplary implementation of first servo bursts 305 and second servo bursts 320 of servo sector 300 in accordance with aspects of the present disclosure. In various embodiments, first servo bursts 305 comprise a first split burst servo pattern and second servo bursts 320 comprise a second split burst servo pattern. Split burst servo patterns are described in U.S. Pat. No. 11,830,524, titled "DATA STORAGE DEVICE WITH SPLIT BURST SERVO PATTERN," and U.S. Pat. No. 12,100,431, titled "DATA STORAGE DEVICE WITH SYMMETRIC SPLIT BURST SERVO PATTERN," the disclosures of both or which are incorporated by reference herein in their entirety. In various embodiments, and as shown in FIG. 5B, the first burst 501 and the third burst 503 (or the second burst 502 and the fourth burst 504) can be split into two or more bursts (e.g., 501A, 501B, 503A, 503B), and a respective PES may be determined using the respective split burst servo patterns in the manner described in the aforementioned patents.

FIGS. 5A and 5B show examples of first servo bursts 305 and second servo bursts 320 in the context of servo sector 300 of FIG. 3A. However, the teaching of FIGS. 5A and 5B are not limited to servo sector 300, and instead may be used with any of the disclosed servo sectors that include first servo bursts 305 and second servo bursts 320, such as servo sector 300' of FIG. 3B, servo sector 300" of FIG. 3C, and servo sector 300" of FIG. 3D. With continued reference to FIGS. 5A and 5B, and in accordance with various aspects of the present disclosure, servo controller 24 determines the PES for the head using values obtained by reading each of first servo bursts 305 and second servo bursts 320. In one example, servo controller 24 determines a first PES using first servo bursts 305, determines a second PES using second servo bursts 320, and determines the PES for the head based on a function of the first PES and the second PES. For example, servo controller 24 may determine the first PES based on values obtained by reading first burst 501 and second burst 502 and determine the second PES based on values obtained by reading third burst 503 and fourth burst 504. In embodiments, the function may be an average such that the PES for the head is an average of the first PES and the second PES. In one example, the function is a weighted average based on a first number of burst cycles associated reading with first servo bursts 305 and a second number of burst cycles associated with reading second servo bursts 320.

In another example, servo controller 24 determines the PES for the head by determining a first sum of values obtained by reading first burst 501 and third burst 503, determining a second sum of values obtained by reading second burst 502 and fourth burst 504, and determining the PES using the first sum and the second sum. In this example, servo controller 24 may be configured to adjust the values obtained by reading first burst 501 and third burst 503 and the values obtained by reading second burst 502 and fourth burst 504 to synchronous amplitudes prior to summing the respective values.

In another example, servo controller 24 determines the PES for the head by performing a first asynchronous PES calculation using first burst 501 and second burst 502, performing a second asynchronous PES calculation using third burst 503 and fourth burst 504, and determining the PES based on the first asynchronous PES calculation and the second asynchronous PES calculation. In this example, the respective asynchronous PES calculations may be performed in the manner described in U.S. Pat. No. 12,046,256, titled "DATA STORAGE DEVICE READ/WRITE CHANNEL WITH DIRECT RADIAL POSITION DEMODULATION IN ASYNCHRONOUS POSITION ERROR SIGNAL DEMODULATION," the disclosure of which is incorporated by reference herein in its entirety. In this example, the PES may be an average of the first asynchronous PES calculation and the second asynchronous PES calculation. In some embodiments, such as those using servo sector 300"" of FIG. 3E, the PES is determined from second servo bursts 320 using synchronous PES calculation without first servo bursts 305. In embodiments that include RRO data 325 (such as FIGS. 3B, 3D, and 3E), the control signal is determined based on the PES and the RRO correction data included in the RRO data 325.

Figure 6:
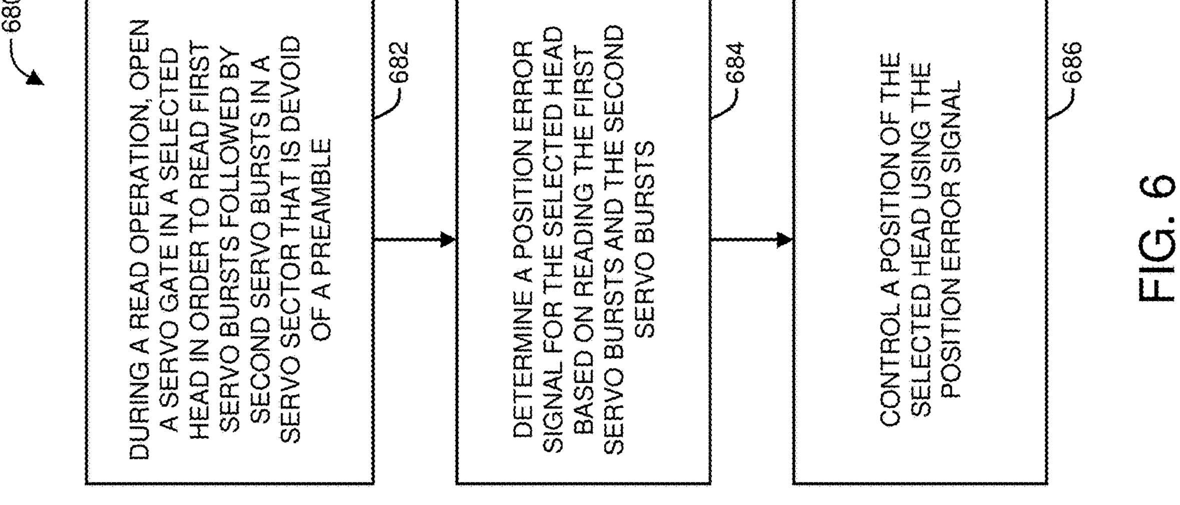
FIG. 6 depicts a flowchart for an example method that control circuitry of a disk drive may perform or execute in controlling the operations of the disk drive, in accordance with aspects of the present disclosure.

FIG. 6 depicts a flowchart for an example method 680 that servo controller 24 of control circuitry 22 may perform or execute in controlling the operations of disk drive 15, in accordance with aspects of the present disclosure. In embodiments, method 680 includes: during a read operation, open a servo gate in a selected head in order to read first servo bursts followed by second servo bursts in a servo sector that is devoid of a preamble (682); determine a position error signal for the selected head based on reading the first servo bursts and the second servo bursts (684); and control a position of the selected head using the position error signal (686).

Figure 7:
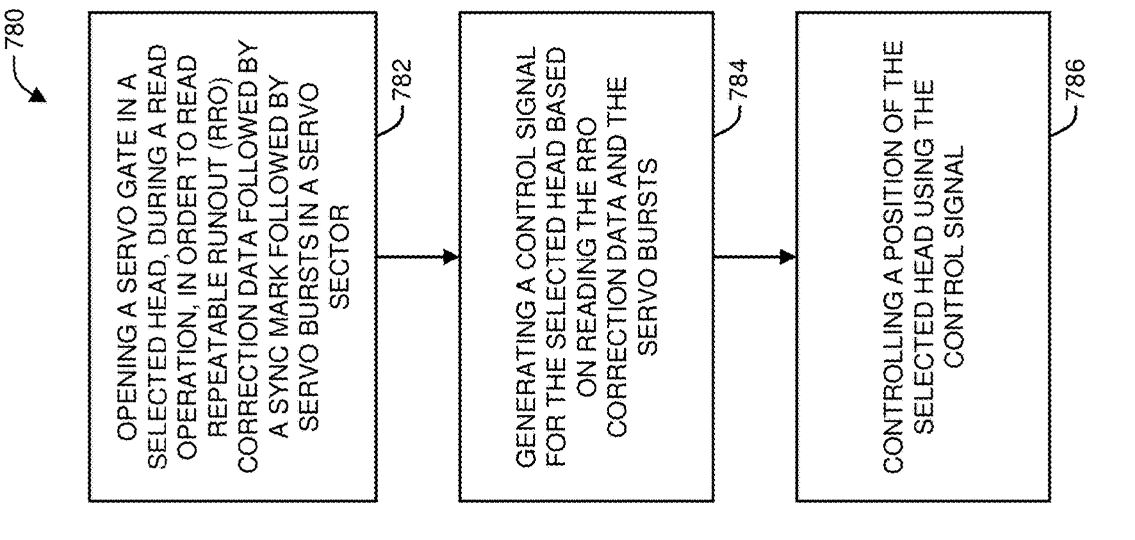
FIG. 7 depicts a flowchart for an example method that control circuitry of a disk drive may perform or execute in controlling the operations of the disk drive, in accordance with aspects of the present disclosure.

FIG. 7 depicts a flowchart for an example method 780 that servo controller 24 of control circuitry 22 may perform or execute in controlling the operations of disk drive 15, in accordance with aspects of the present disclosure. In embodiments, method 780 includes: opening a servo gate in a selected head, during a read operation, in order to read repeatable runout (RRO) correction data followed by a sync mark followed by servo bursts in a servo sector (782); generating a control signal for the selected head based on reading the RRO correction data and the servo bursts (784); and controlling a position of the selected head using the control signal (786). The generating the control signal may comprise determining a PES using one or more servo burst patterns and determining the control signal based on the PES and the RRO correction data.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
- one or more disks each comprising a plurality of servo sectors defining a plurality of data tracks, wherein each of the servo sectors comprises first servo bursts followed by a sync mark followed by second servo bursts;
- an actuator mechanism configured to position a selected head among one or more heads proximate to a corresponding disk surface of a corresponding disk among the one or more disks; and
- one or more processing devices, individually or in combination, configured to:
  - during a read operation, open a servo gate in the selected head to read the first servo bursts, the sync mark, and the second servo bursts in one of the servo sectors; and
  - determine a position error signal for the selected head based on reading the first servo bursts and the second servo bursts.

2. The data storage device of claim 1, wherein the read operation is configured to read data stored in a data sector immediately following the one of the servo sectors.

3. The data storage device of claim 1, wherein each of the servo sectors further comprises a track identifier (ID) between the first servo bursts and the second servo bursts.

4. The data storage device of claim 1, wherein each of the servo sectors is devoid of a preamble.

5. The data storage device of claim 1, wherein each of the servo sectors further comprises a preamble between the first servo bursts and the second servo bursts.

6. The data storage device of claim 1, wherein the position error signal comprises an average of a first position error signal determined using the first servo bursts and a second position error signal determined using the second servo bursts.

7. The data storage device of claim 6, wherein the average is a weighted average based on a first number of burst cycles associated with reading the first servo bursts and a second number of burst cycles associated with reading the second servo bursts.

8. The data storage device of claim 1, wherein:
- the first servo bursts comprise a first burst and a second burst;
- the second servo bursts comprise a third burst and a fourth burst;
- the first burst and the third burst are a first burst type; and
- the second burst and the fourth burst are a second burst type different than the first burst type.

9. The data storage device of claim 8, wherein the position error signal is determined using a sum of values obtained by reading the first burst and the third burst and a sum of values obtained by reading the second burst and the fourth burst.

10. The data storage device of claim 8, wherein the determining the position error signal comprises:
- performing a first asynchronous position error signal calculation using the first burst and the second burst;
- performing a second asynchronous position error signal calculation using the third burst and the fourth burst; and
- determining the position error signal based on the first asynchronous position error signal calculation and the second asynchronous position error signal calculation.

11. The data storage device of claim 1, wherein each of the servo sectors further comprises repeatable runout (RRO) correction data.

12. The data storage device of claim 11, wherein the RRO correction data is followed by the sync mark.

13. The data storage device of claim 1, wherein the one or more processing devices, individually or in combination, are further configured to control a position of the selected head using the position error signal.

14. The data storage device of claim 1, wherein:
- the first servo bursts comprise a first split burst servo pattern; and
- the second servo bursts comprise a second split burst servo pattern.

15. A method comprising:
- during a read operation, opening a servo gate in a selected head to read first servo bursts followed by second servo bursts in a servo sector that is devoid of a preamble and devoid of a sync mark;
- determining a position error signal for the selected head based on reading the first servo bursts and the second servo bursts; and
- controlling a position of the selected head using the position error signal,
- wherein the opening the servo gate, the determining the position error signal, and the controlling the position of the selected head are performed by one or more processing devices individually or in combination.

16. The method of claim 15, wherein:
- the first servo bursts comprise a first burst and a second burst;

the second servo bursts comprise a third burst and a fourth burst;

the first burst and the third burst are a first burst type; and the second burst and the fourth burst are a second burst type different than the first burst type.

17. One or more processing devices comprising, individually or in combination:

means for opening a servo gate in a selected head, during a read operation, to read repeatable runout (RRO) correction data followed by a sync mark followed by servo bursts in a servo sector;

means for generating a control signal for the selected head based on reading the RRO correction data and the servo bursts; and means for controlling a position of the selected head using the control signal.

18. The one or more processing devices of claim 17, wherein:

the servo sector comprises first servo bursts preceding the sync mark;

the servo bursts following the sync mark comprise second servo bursts; and the control signal is generated based on reading the RRO correction data, the first servo bursts, and the second servo bursts.

19. The one or more processing devices of claim 18, further comprising, individually or in combination, means for determining a position error signal using respective values obtained by reading the first servo bursts and the second servo bursts.

20. The one or more processing devices of claim 17, wherein the servo sector comprises a preamble between the RRO correction data and the sync mark.

* * * * *